(12) United States Patent
Condon et al.

(10) Patent No.: US 9,284,965 B2
(45) Date of Patent: *Mar. 15, 2016

(54) IN-LINE WATER HAMMER ARRESTER

(71) Applicants: Duane Condon, Ramona, CA (US); LSP Products Group, Inc., Irving, TX (US)

(72) Inventors: Duane Condon, Ramona, CA (US); Bill Ghiglieri, Reno, NV (US)

(73) Assignee: LSP Products Group, Inc., Irving, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/539,418

(22) Filed: Nov. 12, 2014

(65) Prior Publication Data

US 2015/0068631 A1   Mar. 12, 2015

Related U.S. Application Data

(63) Continuation of application No. 13/837,256, filed on Mar. 15, 2013, now Pat. No. 8,939,177.

(51) Int. Cl.
*F16L 55/04* (2006.01)
*F16L 55/053* (2006.01)
*F15B 1/24* (2006.01)

(52) U.S. Cl.
CPC *F15B 1/24* (2013.01); *F16L 55/053* (2013.01)

(58) Field of Classification Search
CPC .......... F16L 55/04; F16L 55/053; F15B 1/24
USPC ................................. 138/31, 30, 44, 45, 109
See application file for complete search history.

(56) References Cited

U.S. PATENT DOCUMENTS

| 2,729,244 | A | | 9/1952 | Alaska et al. |
| 3,536,102 | A | | 10/1970 | Allewitz et al. |
| 4,991,876 | A | * | 2/1991 | Mulvey ........................ 285/21.1 |
| 5,819,802 | A | | 10/1998 | Fan |
| 5,865,209 | A | * | 2/1999 | Vidal ..................... E03C 1/102 137/216 |
| 5,996,632 | A | | 12/1999 | Vogel et al. |
| 6,089,274 | A | | 7/2000 | Fan |
| 6,672,337 | B2 | | 1/2004 | Kobayashi et al. |
| 7,156,120 | B2 | | 1/2007 | Cherfane et al. |
| 8,307,855 | B2 | | 11/2012 | Al-Khomairi |
| 8,517,057 | B2 | * | 8/2013 | Rose ................... F16L 55/0331 138/26 |
| 2002/0129861 | A1 | * | 9/2002 | Holdenried ................... 138/109 |
| 2007/0209707 | A1 | | 9/2007 | Weltman |
| 2013/0299029 | A1 | | 11/2013 | Spedding |

FOREIGN PATENT DOCUMENTS

| EP | 0440360 | 1/1990 |
| FR | 1081881 | 5/1953 |

* cited by examiner

*Primary Examiner* — Patrick F Brinson
(74) *Attorney, Agent, or Firm* — Ross Barnes LLP; Monty L. Ross; Robin L Barnes

(57) ABSTRACT

An in-line water hammer arrester comprises a housing connectable at each end to a piping system, a fluid channel disposed within the housing to permit fluid to flow from the piping system through the housing and back into the piping system, a piston and a pressurized gas chamber. When a pressure spike occurs, the piston is pushed against the pressurized gas chamber allowing an expanded area for water flow until the pressure spike is dissipated and the piston returns to its resting position. When used with flexible hoses and tubing typically found with household appliance water supply lines, the in-line arrester is easily installed by a crimping or clamping type connector and takes up little space.

12 Claims, 2 Drawing Sheets

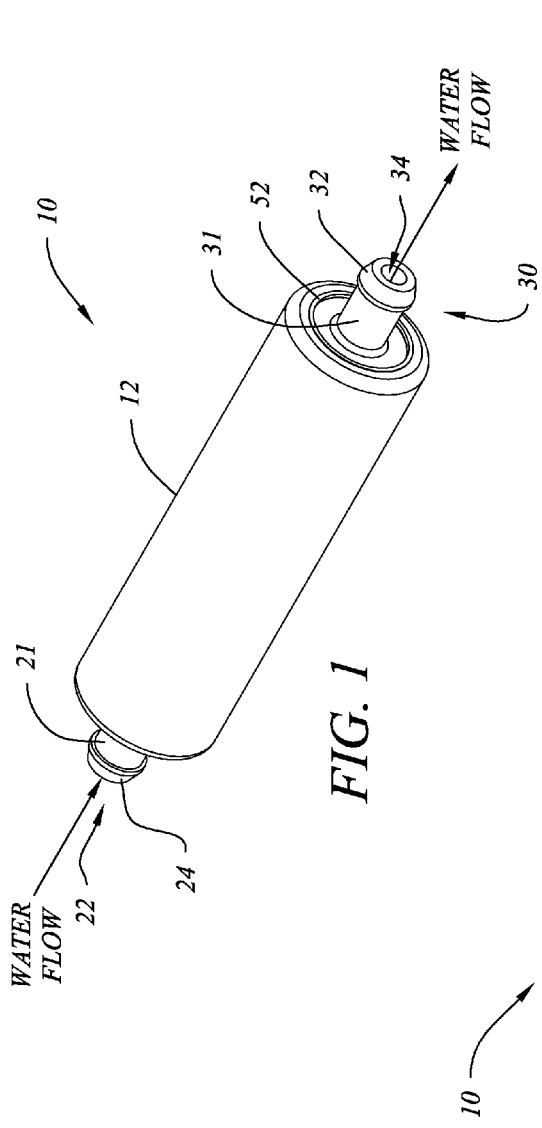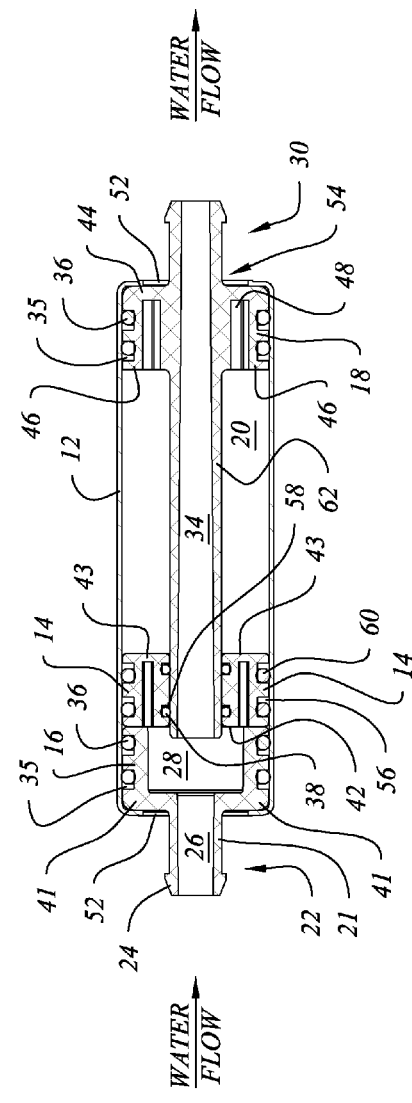

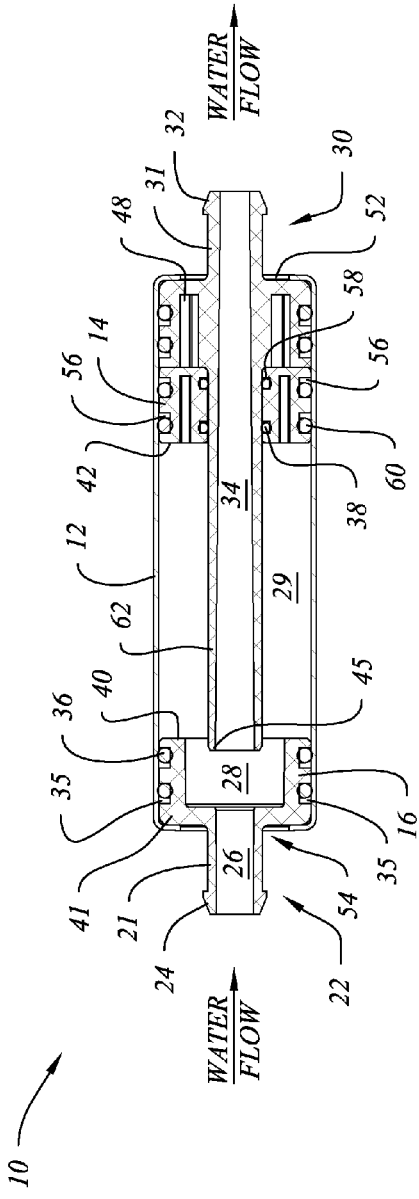
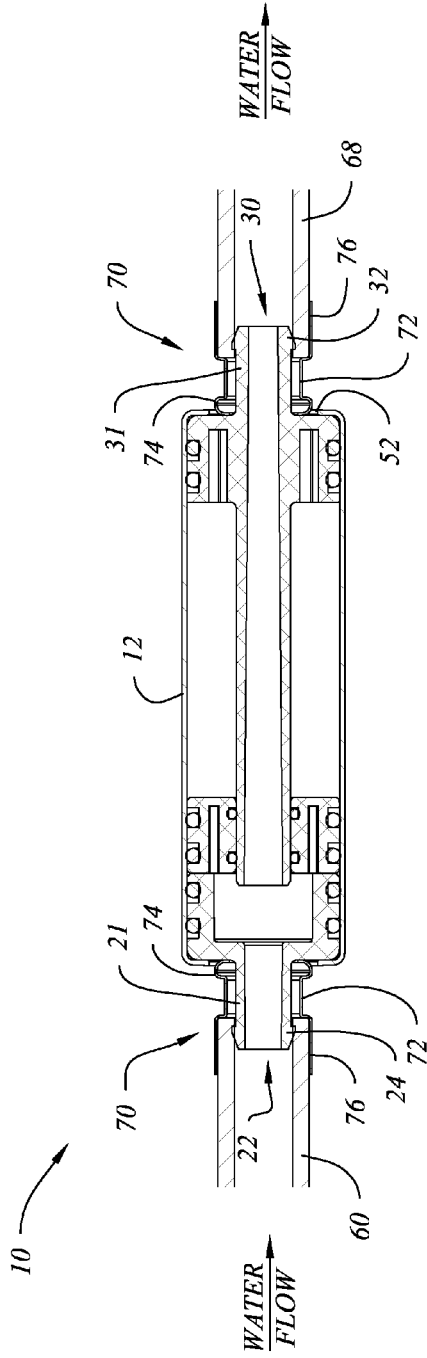

IN-LINE WATER HAMMER ARRESTER

CROSS REFERENCE TO RELATED APPLICATION

This application is a continuation of U.S. patent application Ser. No. 13/837,256 filed on Mar. 15, 2013.

BACKGROUND OF THE INVENTION

1. Field of the Invention

This invention relates to an in-line device for dampening pressure spikes and reducing "water hammer" noise caused by abrupt pressure changes within a pipe, hose, or flexible tubing when the flow of water is shut-off.

2. Description of Related Art

Water hammer is a common occurrence when there is a sudden change in pressure in a pipe caused by shutting-off the flow of water through the pipe. Pressure spikes associated with quick shut-off valves can be 5 times or more greater than the normal pressure within the system. These changes in pressure may cause rattling and shaking of the pipes, producing the typical "hammering" noise associated with this problem, although the pressure change may cause damage to the piping system even when there is no hammering noise. The pressure spike can reverberate backward from a valve and cause damage to parts throughout the system, including fittings, valves, backflow preventers, and appliances connected to the piping system.

One way of preventing water hammer is by installing a water hammer arrester. These devices typically include a pipe, capped at one end, with a piston and a pressurized air pocket between the piston and the capped end, with the open end of the pipe connected to a pipe in the system just upstream of where a pressure spike may occur or connected at a valve and typically included in a valve outlet box. The arrester is typically installed perpendicular to the system pipe. When a pressure spike occurs, the pressurized water pushes against the piston in the arrester, which moves against the compressed air pocket until the pressure is stabilized and the piston returns to its normal, resting position within the arrester. This dampens the pressure so that it does not reverberate back through the piping system.

This type of prior art hammer arrester works well with fixed piping installations, but requires extra room for installation and larger sized outlet boxes to accommodate the arrester. Additionally, it is more difficult to install since it typically involves soldering pipe, compression joints, crimping on to PEX, or other various means of connections. If it becomes necessary to retro-fit a piping system with a hammer arrester, then the difficulty increases since it is more difficult to access piping within walls or to add a hammer arrestor at an existing outlet box. Moreover, this type of design does not work with flexible hoses and tubing typically found on washing machines, dishwashers, and refrigerators/ice makers, even though the valves used with these appliances may cause severe pressure spikes.

In-line type arresters are also known, which have advantages over a T-connector style arrester, but these use dampening materials rather than pistons. For example, U.S. Pat. No. 6,672,337 discloses a cushioning diaphragm around a fluid chamber and U.S. Pat. No. 8,307,855 discloses a set of gas-filled balloons within a larger diameter pipe for dampening the pressure spike. A piston is more effective than cushioning materials.

SUMMARY OF THE INVENTION

The water hammer arrester apparatus disclosed herein may be added to standard and preexisting flexible hoses and tubing typically found on supply lines for washing machines, dishwashers, and refrigerators/ice makers. According to one embodiment of the invention, the water hammer arrester is installed in-line in a flexible hose by crimping or otherwise sealing the water hammer arrestor in the middle of a standard hose. This way a water hammer arrestor installation is as easy as for the average homeowner as installing a standard hose and it can be done without requiring professional assistance. Moreover, the apparatus is relatively small and the diameter is only slightly larger than the typical diameter of flexible hose supply lines for household appliances, so it can easily fit in the same space that housed a standard flexible supply line before installation of the arrester with supply line. With the use of the apparatus according to an embodiment of the invention, it would not be necessary to install arresters in a valve outlet box, which will allow for smaller boxes which are less expensive.

According to another embodiment of the invention, the water hammer arrestor comprises a piston and a pressurized gas chamber, similar to prior art devices, but the arrestor is in-line with the system and the water passes through the arrester. This in-line design allows the arrester to be compact and easy to install on existing flexible hoses or tubing.

These and other features, objects and advantages of the present invention will become better understood from a consideration of the following detailed description of the preferred embodiments and appended claims in conjunction with the drawings. Although the discussion of the preferred embodiment will focus on use of the apparatus with flexible hoses and tubing, the invention may be used with copper pipe, CPVC pipe, PEX pipe, and other hard surface piping systems with different means of connecting the ends of the apparatus in-line with these pipes, as will be understood by those of ordinary skill in the art. Additionally, the invention may be installed inside an appliance, such as a washing machine or dishwasher, by the manufacturer of the appliance, as will also be understood by those of ordinary skill in the art.

BRIEF DESCRIPTION OF THE DRAWINGS

The apparatus of the invention is further described and explained in relation to the following drawings wherein:

FIG. 1 is a perspective view of one embodiment of an apparatus according to the invention;

FIG. 2 is cross-sectional side elevation view of the apparatus of FIG. 1 with the piston in its resting position;

FIG. 3 is a cross-sectional side elevation view of the apparatus of FIG. 2 with the piston in fully compressed position;

FIG. 4 is cross-sectional side elevation view of the apparatus of FIG. 1 as connected to a flexible hose.

DESCRIPTION OF THE PREFERRED EMBODIMENTS

Referring to FIG. 1, one preferred embodiment of an in-line water arrester apparatus 10 is depicted. Apparatus 10 preferably comprises a cylindrical housing 12 having a shoulder 52 at each end, a first end fitting 22, a second end fitting 30, and a longitudinal fluid channel 34. During normal operation of a piping system (including a system using hard pipe material or flexible hoses or tubing), water flows from first fitting 22 (the upstream or rearward end) toward the second fitting 30 (the downstream or front end). Apparatus 10 is installed upstream from a valve that would close and create a pressure spike. Typically, such a valve is part of the appliance with which the arrester is being used. For use with a washing machine, for example, arrester 10 would be installed in the flexible water supply line between the water supply valve (which is usually left in the on position and is not the source of the pressure spike) installed in the outlet box at the wall and the washing machine. Each end fitting 22 and 30 preferably comprises a barbed end 24 and 32 and a neck portion 21 and 31 that extends outwardly beyond shoulder 52. Alternatively, arrester 10 may be installed inside an appliance, most preferably by the manufacturer of the appliance, near the appliance valve that may cause water hammer.

A preferred embodiment of arrester apparatus 10 is depicted in FIGS. 2 and 3. Arrester apparatus 10 comprises housing 12, first end fitting 22, second end fitting 30, piston 14, pressurized gas chamber 20, and fluid channels 34, 28, and 26. First end fitting 22 is disposed at the upstream end of housing 12. First end fitting 22 comprises a cylindrical body 16 having an interior (or downstream) end 40 and a shoulder 41, a cylindrical neck 21 extending outwardly from shoulder 41, and barbed end 24. Shoulder 41 abuts shoulder 52 of housing 12. Neck 21 extends outwardly (upstream) from housing 12 through aperture 54. Barbed end 24 is preferably widest near neck 21 and tapers as it extends outwardly from neck 21 to facilitate insertion into a flexible hose, with the widest, barbed portion helping to secure the barbed end 24 from dislodging from the flexible hose. A longitudinal fluid channel 26 extends through barbed end 24 and neck 21. Another fluid channel 28 is formed on the interior of cylindrical body 16. Fluid channel 28 has a larger diameter than fluid channel 26. Fluid, typically water flowing through the piping system, may freely flow from fluid channel 26 to fluid channel 28 when water is flowing through the system. At least one, and preferably at least two, annular recesses 35 are disposed within an exterior surface of a sidewall of body 16. Disposed within each annular recess 35 is a sealing ring 36, which frictionally engages an interior wall of housing 12 to secure first end fitting 22 within housing 12 and prevent water from leaking between housing 12 and first end fitting 22.

Piston 14 is preferably substantially cylindrical. At least one, and preferably at least two, annular recesses 56 are disposed within an exterior surface of a sidewall of piston 14. Additionally, at least one, and preferably at least two, annular recesses 58 are disposed within an interior surface of a sidewall of piston 14. Disposed within each annular recess 56 is a sealing ring 60, which provides slidable engagement between piston 14 and an interior wall of housing 12. Disposed within each annular recess 58 is another sealing ring 38, which provides slidable engagement between piston 14 and an exterior wall of fluid shaft 62. Piston 14 may include a channel disposed between annular recesses 56 and 58 to facilitate molding. Sealing rings 60 and 38 prevent water and gas from leaking to or from fluid chamber 28 and pressurized gas chamber 20.

Second end fitting 30 is disposed at the downstream end of housing 12. Second end fitting 30 comprises a substantially cylindrical body 18 having an interior (or upstream) end 46 and a shoulder 44, a cylindrical fluid shaft 62, a cylindrical neck 31 extending outwardly from shoulder 44, and barbed end 32. At least one, and preferably at least two, annular recesses 35 are disposed within an exterior surface of a sidewall of body 18 that is adjacent an interior wall of housing 12. Disposed within each annular recess 35 is a sealing ring 36, which frictionally engages an interior wall of cylindrical housing 12 to secure second end fitting 30 within housing 12 and prevent gas from leaking out of pressurized chamber 20 between housing 12 and second end fitting 30. Shoulder 44 abuts shoulder 52 of cylindrical housing 12. Neck 31 extends outwardly (downstream) from housing 12 through aperture 54. Barbed end 32 is preferably widest near neck 31 and tapers as it extends outwardly from neck 31 to facilitate insertion into a flexible hose, with the widest, barbed portion helping to secure the barbed end 32 from dislodging from the flexible hose. Fluid shaft 62 extends inwardly (upstream) from neck 31. An upstream end 45 of fluid shaft 62 extends partially into fluid chamber 28. An annular chamber 48 is formed between body 18 and fluid shaft 62. A longitudinal fluid channel 34 extends through barbed end 32, neck 31, and fluid shaft 62. Fluid channels 26, 28, and 34 cooperate to provide a continuous fluid channel through arrester apparatus 10. Pressurized gas chamber 20 is formed between an interior wall of housing 12, an exterior wall of fluid shaft 62, end 43 of piston 14, and end 46 of body 18. Pressurized gas chamber 20 should meet the latest edition of ASSE 1010 testing standards to adequately reduce the impact of a pressure spike in the system. Although air is the preferred gas to use in pressurized chamber 20, other gases, preferably inert gases such as nitrogen, may also be used.

Under normal operating conditions, when the pressure in the piping system is stable, piston 14 is in its resting position near first end fitting 22, as shown in FIG. 2. The pressure in pressurized gas chamber 20 is greater than the pressure in the system, which holds piston 14 in the resting position. When a pressure spike occurs, the pressure in the system becomes greater than the pressure in pressurized gas chamber 20, causing piston 14 to move forward toward second end fitting 30. Until piston 14 is moved some distance forwardly by the pressure created by a closing valve, part of end 42 of piston 14 abuts end 40 of body 16. Piston 14 may move forwardly as needed to accommodate the pressure spike. For a severe spike, piston 14 may move forwardly until downstream end 43 abuts end 46 of second end fitting 30, as shown in FIG. 3. Chamber 48 accommodates the gas from chamber 20 when piston 14 is pushed all the way forward. When the piston is pushed forward from its resting position, a fluid chamber 29 forms in the area between an interior wall of housing 12, end 40, piston end 42, and an exterior wall of fluid shaft 62, allowing a greater volume for the water to fill. As the pressure in the system stabilizes, piston 14 moves back to its resting position, pushing fluid out of fluid chamber 29 and back into fluid channel 28 (and channels 26 and 34), and allowing the gas to expand back into pressurized chamber 20.

A preferred embodiment of water hammer arrester apparatus 10, as installed on a flexible hose, is depicted in FIG. 4. Flexible hose 68 connected to a water supply line and an appliance, for example, is cut to expose two open ends. A clamp or crimp-type connector 70 is inserted over each of barbed ends 24 and 32 and abuts a recessed area on shoulder 52 of housing 12 (the recessed area best viewed in FIG. 1). Connector 70 preferably has a hose end 76, a neck 72, and a shoulder end 74. A cut end of hose 68 is inserted into hose end 76 of connector 70 and barbed end 24 is inserted into the cut end of hose 68 inside connector 70. The other cut end of hose 68 is similarly inserted into hose end 76 of the second connector 70 and barbed end 32 is inserted into the cut end of hose 68 inside the second connector 70. Each connector 70 is then crimped or clamped to secure hose 68 to arrester apparatus 10. Any other type of connector suitable for use with flexible hoses or tubing, may be used to connect hose 68 to arrester apparatus 10. Arrester apparatus 10 may be preassembled with shoulder end 74 of connector 70 attached at both ends of apparatus 10, two connectors 70 may come pre-packaged with apparatus 10, or connectors may be purchased separately from apparatus 10. Arrester apparatus 10 may also be used with copper pipe, CPVC, PEX or other hard piping systems using suitable connectors to connect the arrester to the piping as will be understood by those of ordinary skill in the art.

Alternatively, arrester 10 may include threaded or crimping or clamping type connectors pre-attached to or integrally manufactured with either end fittings 22 and 30 and/or housing 12. Such connectors may include washers or similar fittings to prevent water leakage. Such connectors would mate with similar connectors installed on a flexible hose or tubing or piping with which arrester 10 is to be used. In this alternate configuration, barbed ends 24 and 32 may not be necessary and it may not be necessary for necks 21 and 31 to extend outwardly from housing 12. As yet another alternative, arrester 10 may be integrated with or pre-attached to a flexible hose, tubing, or a length of pipe for easier installation. For example, the ends of a flexible hose may come with threaded connectors that are ready to attach to the water supply valve and the inlet of a washing machine, with the arrester 10 already in place on the flexible hose so the user need only tighten the connections at the valve and washer inlet, rather than cutting the hose and having to install the arrester with crimp connectors. Those of ordinary skill in the art will understand the modifications that would be needed for such alternate connection configurations.

First end fitting 22, second end fitting 30, and piston 14 are each preferably unitarily molded as a single part. The preferred materials for first end fitting 22, second end fitting 30, and piston 14 are Acetal, but other plastic or metal materials, such as polysulfone, polyphynelsulfone, steel, brass, or other copper alloy, may also be used. Sealing rings 36, 38, and 60 are preferably standard o-rings. Most preferably, sealing rings 38 are smaller in size than sealing rings 36 and 60, which may be the same size. Additionally, annular recesses 35 on the first end fitting and the second end fitting may be the same size or different sizes, with the sealing rings 36 sized accordingly. Housing 12 is most preferably made of stainless steel, but other materials, such as copper or aluminum or other metals or plastics may also be used.

References to front (or forward) and rear (or back) herein generally refer to the direction of water flow, with forward being in the downstream direction. Those of ordinary skill in the art will also appreciate upon reading this specification and the description of preferred embodiments herein that modifications and alterations to the apparatus may be made within the scope of the invention and it is intended that the scope of the invention disclosed herein be limited only by the broadest interpretation of the appended claims to which the inventors are legally entitled.

We claim:

1. A pressure spike reducing apparatus comprising:
   a housing connectable at each end to a pipe or hose through which fluid may flow, the housing having a fluid channel to permit the flow of fluid from the pipe or hose at one end of the housing through to the pipe or hose at the other end of the housing;
   a piston disposed within the housing and around the fluid channel; and
   a closed pressurized gas chamber disposed within the housing and around the fluid channel on a downstream side of the piston;
   a first fitting disposed at the upstream end of the housing and a second fitting disposed at the downstream end of the housing, each fitting comprising a neck extending outwardly from the housing that is engageable with the pipe or hose;
   wherein the closed pressurized gas chamber is configured to hold the piston in a first upstream position until a pressure spike in the pipe or hose occurs; and
   wherein when a pressure spike occurs, the pressure causes the piston to move to a second downstream position to create a fluid chamber within the housing.

2. The apparatus according to claim 1 wherein each fitting further comprises a barbed end disposed at an outer end of the neck.

3. The apparatus of claim 1 wherein the second fitting further comprises a shaft extending inwardly from the neck, wherein such shaft forms part of the fluid channel.

4. The apparatus according to claim 3 wherein the fluid channel comprises a first channel disposed within the neck of the first fitting, a second channel disposed within the housing, a third channel disposed within the shaft, and a fourth channel disposed within the neck of the second fitting when the piston is in its first upstream position.

5. The apparatus according to claim 3 configured to allow fluid flow in the shaft when a pressure spike in the pipe or hose occurs.

6. The apparatus according to claim 3 configured so that the shaft remains open to fluid flow when a pressure spike occurs.

7. The apparatus of claim 1 wherein the first end fitting and the second end fitting each further comprises a substantially cylindrical body disposed inside the housing.

8. The apparatus of claim 7 wherein the second fitting further comprises a substantially cylindrical shaft extending inwardly from the neck and through the body;
   wherein the shaft, body, and neck are integrally formed;
   wherein the closed pressurized gas chamber is configured to hold the piston in a first upstream position until a pressure spike in the pipe or hose occurs; and
   wherein when a pressure spike occurs, the pressure causes the piston to move to a second downstream position compressing the gas in the closed pressurized gas chamber.

9. The apparatus of claim 8 wherein the fluid channel comprises a first channel disposed within the neck of the first fitting, a second channel disposed within the body of the first fitting, a third channel disposed within the shaft, and a fourth channel disposed within the neck of the second fitting when the piston is in its first upstream position.

10. The apparatus of claim 9 wherein the fluid channel further comprises a fifth channel disposed within the housing and around the shaft when the piston is in its second downstream position.

11. The apparatus of claim 7 wherein the housing comprises an inwardly projecting shoulder at each end, each shoulder configured to engage with the body of one of the fittings to hold the fittings inside the housing.

12. The apparatus of claim 8 wherein the shaft comprises a sold sidewall configured to allow fluid to flow through the shaft from the upstream end of the shaft through to the downstream end of the shaft.

* * * * *